T. HARDING.
Bag Holder.
No. 69,989.  
Patented Oct. 22, 1867.
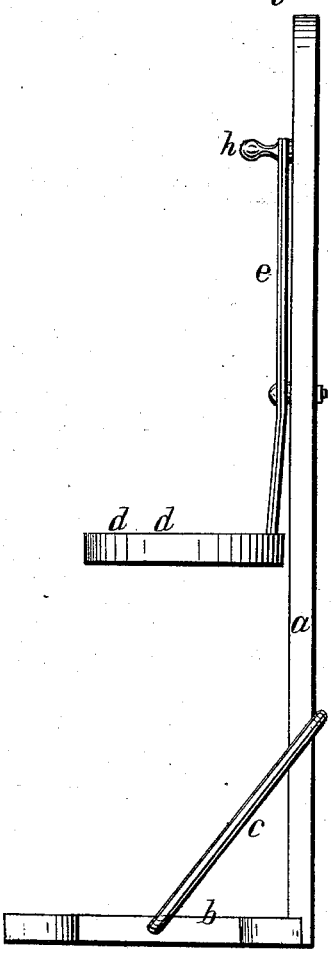
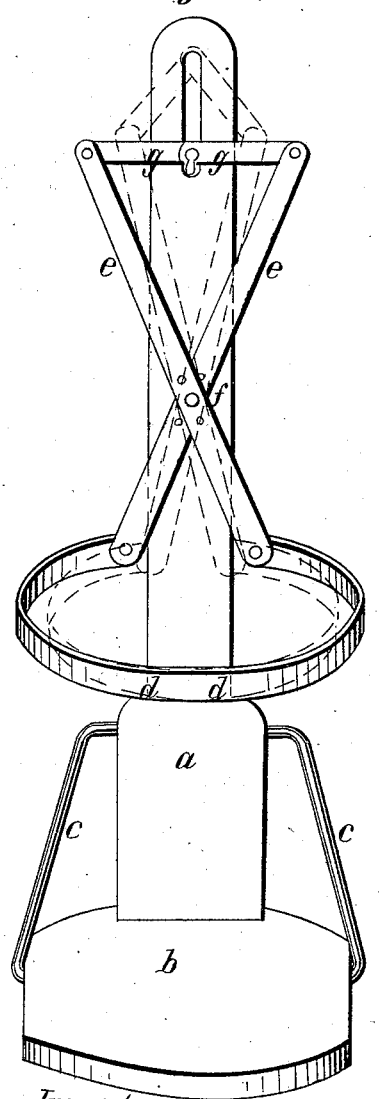

United States Patent Office.

THOMAS HARDING, OF SPRINGFIELD, OHIO.

Letters Patent No. 69,989, dated October 22, 1867.

IMPROVED BAG-HOLDER.

*The Schedule referred to in these Letters Patent and making part of the same.*

TO ALL WHOM IT MAY CONCERN:

Be it known that I, THOMAS HARDING, of Springfield, county of Clark, and State of Ohio, have invented a new and useful Machine for Holding Bags Open when it is desired to fill them with grain or other material; and I do hereby declare that the following is a clear and exact description.

My improvement consists of a wooden stand, $a$, and a wood base, B, as shown in Figures 1 and 2, and made rigid by means of the braces C C. D represents an open spring-hoop, oval-shaped, and fastened to the lower end of the levers E E by means of bolts or rivets. At the top end of the levers are attached two short bars, which are fastened to the stem of the handle H at the other end, and thereby forming an elbow-joint. The stem of the handle H is left long, so as to work in the slot of the wood stand $a$, for the purpose of keeping the levers E E in their proper position. The levers E E are fastened at the centre by a pivot-bolt, so as to work freely on the centre. The number of holes at the centre of the levers is for the purpose of increasing or decreasing the length of the leverage, so as to expand the spring-hoop more or less to suit the size of the bags.

The operation is, to raise the handle H to the top of the slot in the wood stand, as shown by the dotted lines, and thereby contracting the hoop. Then draw the mouth of the bag around the hoop, and shove the handle H to the bottom of the slot; that will expand the hoop inside of the bag, and hold it up and open.

Having thus described my invention, what I claim as new, and desire to secure by Letters Patent, is—

The expanding and contracting of the open spring-hoop by means of the levers E E, as shown in fig. 1, in connection with the short bars or levers G G, constructed and operating as and for the purposes herein set forth.

In testimony whereof I have hereunto set my hand this 22d day of March, 1867.

THOMAS HARDING.

Witnesses:
MARTIN L. RICE,
REUBEN MILLER.